(12) United States Patent
Kim et al.

(10) Patent No.: US 8,041,034 B2
(45) Date of Patent: Oct. 18, 2011

(54) MULTI-STREAMING APPARATUS AND MULTI-STREAMING METHOD USING TEMPORARY STORAGE MEDIUM

(75) Inventors: Chi-hurn Kim, Hwuseong-si (KR); Jung-wan Ko, Suwon-si (KR); Yong-kuk You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1761 days.

(21) Appl. No.: 11/224,146

(22) Filed: Sep. 13, 2005

(65) Prior Publication Data

US 2006/0071824 A1 Apr. 6, 2006

(30) Foreign Application Priority Data

Sep. 13, 2004 (KR) .................. 10-2004-0073132

(51) Int. Cl.
*H04N 7/167* (2011.01)
(52) U.S. Cl. ........................................ 380/201
(58) Field of Classification Search .................. 380/200, 380/201, 277; 713/163, 193; 341/50; 725/25, 725/31
See application file for complete search history.

(56) References Cited

U.S. PATENT DOCUMENTS

| | | | |
|---|---|---|---|
| 6,882,792 B2* | 4/2005 | Sawada | 386/230 |
| 7,043,558 B2 | 5/2006 | Yoshida et al. | |
| 7,548,984 B2 | 6/2009 | Kurauchi | |
| 7,602,914 B2* | 10/2009 | Wasilewski | 380/228 |
| 7,630,499 B2* | 12/2009 | Wasilewski | 380/286 |
| 7,650,621 B2* | 1/2010 | Thomas et al. | 725/87 |
| 7,809,240 B2* | 10/2010 | Nomura | 386/343 |
| 2002/0120574 A1 | 8/2002 | Ezaki | |
| 2004/0045036 A1 | 3/2004 | Terasaki | |
| 2006/0020786 A1* | 1/2006 | Helms et al. | 713/165 |

FOREIGN PATENT DOCUMENTS

| | | |
|---|---|---|
| EP | 0 756 279 A2 | 1/1997 |
| EP | 1 304 844 A1 | 4/2003 |
| EP | 1 395 057 A1 | 3/2004 |
| JP | 2-77885 A | 3/1990 |
| JP | 8-70437 A | 3/1996 |
| JP | 08-125651 A | 5/1996 |

(Continued)

OTHER PUBLICATIONS

Sekiguchi T et al., "A Noncompressed NTSC Digital Videodisk Recorder Using Magneto-Optical Media" SMPTE Journal, SMPTE Inc. Scarsdale, N.Y. US, vol. 105, No. 8, Aug. 1996, pp. 490-496, XP000627184.

(Continued)

*Primary Examiner* — Beemnet Dada
(74) *Attorney, Agent, or Firm* — Sughrue Mion, PLLC

(57) ABSTRACT

Disclosed are a method of multi-streaming encrypted contents stored in a storage medium to a second player during streaming the contents to a first player, and an apparatus using the same. The method includes: temporarily storing the encrypted contents streaming to the first player in a temporary storage medium; and streaming the stored contents to the second player in response to a multi-streaming command input by a user to the second player, wherein key generation information required to decrypt the encrypted contents is not stored in the temporary storage medium. It is possible to provide a multi-streaming with a copy protection through temporary storage, and also to reduce noise caused by rotation of the disc in the streaming apparatus.

22 Claims, 5 Drawing Sheets

FOREIGN PATENT DOCUMENTS

| | | |
|---|---|---|
| JP | 8163508 A | 6/1996 |
| JP | 8204741 A | 8/1996 |
| JP | 10-108139 A | 4/1998 |
| JP | 10-304299 A | 11/1998 |
| JP | 11-177962 A | 7/1999 |
| JP | 2001345767 A | 12/2001 |
| JP | 2002-123496 A | 4/2002 |
| JP | 2002290952 A | 10/2002 |
| JP | 2003037571 A | 2/2003 |
| JP | 2003153229 A | 5/2003 |
| JP | 2004056774 A | 2/2004 |
| JP | 2004088466 A | 3/2004 |
| KR | 97-50710 A | 7/1997 |
| KR | 97-50990 A | 9/1998 |
| WO | 01/54345 A1 | 7/2001 |
| WO | 03098867 A2 | 11/2003 |

OTHER PUBLICATIONS

Shim S et al., "An Effective Data Placement Scheme to Serve Popular Video On-Demand", Proceedings of the Pacific Workshop on Distributed Multimedia Systems, 1996, pp. 153-162, XP000874691.

Office Action issued by the Japanese Patent Office dated Feb. 15, 2011 in a counterpart application No. 2005-261225.

Japanese Office action dated Jul. 5, 2011 in counterpart Japanese application No. 2005261225.

* cited by examiner

MULTI-STREAMING APPARATUS AND MULTI-STREAMING METHOD USING TEMPORARY STORAGE MEDIUM

This application claims the priority of Korean Patent Application No. 10-2004-0073132, filed on Sep. 13, 2004, in the Korean Intellectual Property Office, the disclosure of which is incorporated herein in its entirety by reference.

BACKGROUND OF THE INVENTION

1. Field of the Invention

The present invention relates to a multi-streaming apparatus and a multi-streaming method, and more particularly, to a multi-streaming apparatus and a multi-streaming method which reduce noise and provide a content copy protection by using a temporary storage medium.

2. Description of Related Art

Conventional home networks require multi-streaming of contents stored in a storage medium to a plurality of players. Typically, a streaming apparatus reads contents from a storage medium and produces streaming packets to transmit them to one or more players. The player receives packets, reorganizes the contents, decodes them according to a predetermined moving picture compression standard, and plays back the contents.

A streaming apparatus can read different portions of a certain content stored in a storage medium. For example, two or more players may simultaneously read a 2-hour movie from a 5-minute location after the start of the movie and from a 1-hour location after the start of the movie, respectively. In addition, a streaming server in the player can perform a multi-streaming of the contents from one or more sources.

FIG. 1 illustrates a conventional streaming apparatus 10.

The streaming apparatus 10 includes a disc drive 12, a decryption unit 13, and a streaming server 14.

The disc drive 12 reads binary signals from a storage medium 11, and extracts a content key 16 and key generation information 17 from the binary signals. The key generation information 17 is information used to decrypt the contents, for example, information used to produce the decryption key for decrypting the contents.

The decryption unit 13 decrypts the contents 16 based on the key generation information 17 and additional information to produce decrypted contents 18. Here, the additional information means information used or generated in the streaming apparatus 10. The decryption unit 13 may include all functions necessary for only authorized persons to decrypt corresponding contents through various methods such as authentication of the streaming apparatus. Thus, the decryption unit 13 is called a content protection system (CPS).

The streaming server 14 produces streaming packets 19 by using the decrypted contents 18 and transmits the streaming packets to the player 20.

The player 20 includes a streaming client 21 and a decoder 22. The streaming client 21 combines the streaming packets 19 to reorganize the contents 23, and the decoder 22 decodes the contents 23 according to a predetermined moving picture compression standard to produce video signals 24 and display them.

When two or more players 20 are provided, the disc drive 12, the decryption unit 13, and the streaming server 14 are concurrently operated in the streaming apparatus 10. For convenience of explanation, a stream to a first device is referred to as a first stream and a stream to a second device is referred to as a second stream. The disc drive 12 concurrently reads binary signals corresponding to the first stream and the second stream, respectively, and extracts contents and key generation information of the first stream, and another contents and key generation information of the second stream, respectively. Also, the decryption unit 13 and the streaming server 14 concurrently process a decryption and streaming procedure for the first stream and another decryption and decryption procedure for the second stream.

Unfortunately, the conventional streaming apparatus generates noise. Since the disc drive is required to read the binary signals from a storage medium 11 at a speed of "1× speed*the number of players," in theory, the disc must be rotated at a high speed, thereby generating noise.

For example, supposing a family member in a living room starts to watch a movie stored in a blue-ray disc ROM installed in the living room, and another family member in another room tries to watch the same movie from the beginning after one hour, the family member in the living room will see the movie with noise caused by the rotation of the disc.

Furthermore, an experimental result shows that the blue-ray disc would require a 4× or more speed for a normal playback in streaming a video content to two or more players when the video content to be played requires a high definition (HD) quality or higher. In this case, the noise problem can not be avoided.

On the other hand, recently, the whole contents are encrypted and then stored in a storage medium for copy protection, and a content protection system is included in a streaming apparatus. However, a multi-streaming apparatus having such a copy protection function has not been yet provided.

SUMMARY OF THE INVENTION

The present invention provides a method of streaming contents to a second player during the streaming of contents to a first player such that there is no need to abruptly increase a speed of a disc drive in a streaming apparatus and it is possible to reduce noise generated in the disc drive.

Also, the present invention provides a streaming apparatus capable of preventing illegal copying of contents stored in an encrypted state.

According to an aspect of the present invention, there is provided an apparatus for multi-streaming encrypted contents stored in a storage medium to a second player during streaming the contents to a first player, the apparatus comprising: a disc drive configured to read the encrypted contents stored on the storage medium, a decryption unit configured to decrypt the encrypted contents read by the disc drive, a streaming server configured to generate streaming packets by converting the decrypted contents according to a streaming protocol and to transmit the streaming packets to the first and second players, and a temporary storage unit, wherein the encrypted contents corresponding to the streaming packets to be transmitted to the second player are temporarily stored in the temporary storage medium prior to being transmitted to the second player in response to a multi-streaming command input by a user of the second player, and wherein key generation information required to decrypt the encrypted contents is not stored in the temporary storage medium.

According to another aspect of the present invention, there is provided an apparatus for multi-streaming information to a second player during the streaming of the contents to a first player, the apparatus comprising: a disc drive configured to extract encrypted contents from a storage medium and to extract key generation information used to decrypt the encrypted contents from the storage medium; a temporary storage unit configured to receive and to store the encrypted contents extracted from the storage medium by the disc drive during the streaming of information to the first player, and to transmit the stored contents to a decryption unit in response to a multi-streaming command from the second player; the decryption unit configured to decrypt the contents by using the key generation information to produce decrypted contents; and a streaming server configured to perform a streaming of the decrypted contents to the first player and the second player according to a streaming protocol.

According to still another aspect of the present invention, there is provided an apparatus for multi-streaming encrypted contents stored in a storage medium to a second player during streaming the contents to a first player, the apparatus comprising: a disc drive configured to extract encrypted contents stored and key generation information required to decrypt the contents from the storage medium; a decryption unit configured to decrypt the encrypted contents by using the key generation information to produce decrypted contents; a link-encryption unit configured to link-encrypt the decrypted contents by using a link-encryption algorithm; a streaming server configured to perform a streaming of the decrypted contents to the first player and the second player according to a streaming protocol; and a temporary storage unit configured to receive and store the contents from the disc drive during the streaming of the link-encrypted contents to the first player, and configured to transmit the stored contents to the streaming server in response to a multi-streaming command input by a user to the second player.

According to still another aspect of the present invention, there is provided a method of multi-streaming encrypted contents stored in a storage medium to a second player during streaming the contents to a first player, the method comprising: temporarily storing the encrypted contents to be streamed to the first player in a temporary storage medium; and streaming the stored contents to the second player in response to a multi-streaming command to the second player, wherein key generation information required to decrypt the encrypted contents is not stored in the temporary storage medium.

According to still another aspect of the present invention, there is provided a method of multi-streaming encrypted contents stored in a storage medium to a second player during streaming the contents to a first player, the method comprising: streaming the contents to the first player; storing the contents in a temporary storage medium in an encrypted state during streaming the contents to the first player; decrypting the stored contents in response to the multi-streaming command from the second player; and streaming the decrypted contents to the second player.

According to still another aspect of the present invention, there is provided a method of multi-streaming encrypted contents stored in a storage medium to a second player during streaming the contents to a first player, the method comprising: streaming the contents to the first player in a link-encrypted state; storing the contents in the temporary storage medium in a link-encrypted state during streaming the contents to the first player; and streaming the stored contents to the second player in response to a multi-streaming command to the second player.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, certain non-limiting and exemplary embodiments of the present invention will be described in detail with reference to the accompanying drawings.

Figure 1:
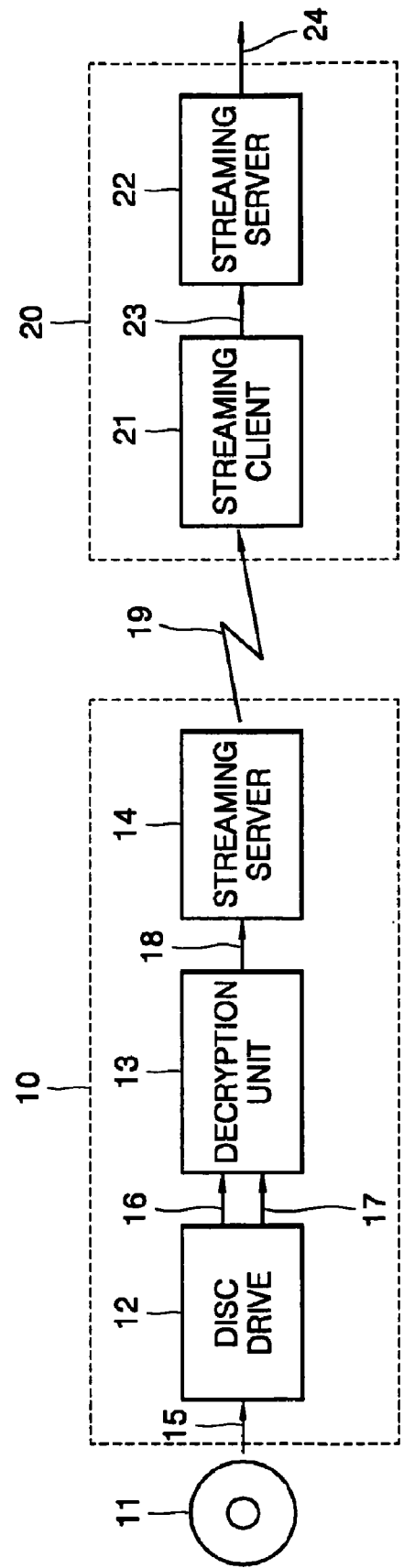
FIG. 1 is a block diagram illustrating a conventional streaming apparatus.
Figure 2:
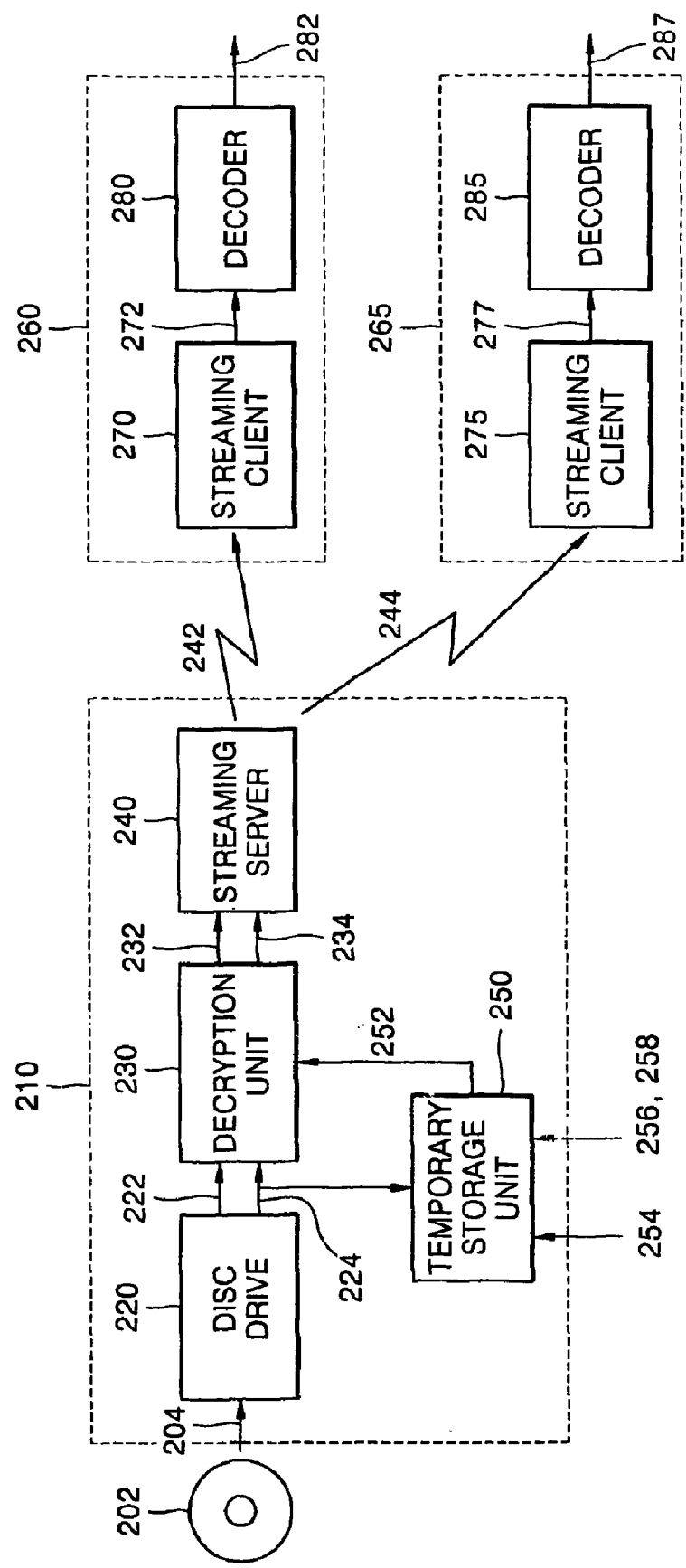
FIG. 2 is a block diagram illustrating a streaming apparatus consistent with one exemplary embodiment of the present invention.

FIG. 2 illustrates a streaming apparatus 210 according to an exemplary embodiment of the present invention.

The streaming apparatus includes a disc drive 220, a decryption unit 230, a streaming server 240, and a temporary storage unit 250.

The disc drive 220 reads binary signals 204 from the storage medium 202, and extracts contents 224 and key generation information 222 from the binary signals. The key generation information 222 is information used to decrypt the contents 224, for example, information used to produce a decryption key for decrypting the contents.

The temporary storage unit 250 receives and stores the contents 224 from the disc drive 220 during streaming to a first player 260. Then, the temporary storage unit 250 transmits the contents 252 to the decryption unit 230 in response to a multi-streaming command 254 input by a user to a second player.

That is, the temporary storage unit 250 has two characteristics as follows. First, the temporary storage unit 250 receives and stores only the contents 224 transmitted to the decryption unit 230 from the disc drive 220, and does not store the key generation information 222. This is to prevent the contents stored in the temporary storage unit 250 from being used to create an illegal copy. Secondly, the temporary storage unit 250 transmits the contents 252 stored in the temporary storage unit 250 only when it receives the multi-streaming command 254. This is to accomplish the multi-streaming operation.

To appropriately accomplish the streaming operation, in a preferred embodiment, the capacity of the temporary storage unit 250 should be larger than or at least equal to that of the storage medium 202.

According to another exemplary embodiment of the present invention, the temporary storage unit 250 deletes all the contents stored in the temporary storage unit 250 when it receives a streaming apparatus power-off command 256 or a storage medium eject command 258. According to yet another exemplary embodiment of the present invention, the streaming apparatus power off command 256 and the storage medium eject command 258 may be received from the disc drive 220.

According to still another exemplary embodiment of the present invention, the temporary storage unit 250 is designed to extract part of the contents corresponding to a playback location requested by a user and transmit them to the decryption unit 220. In this case, the multi-streaming command input by the user includes information on the playback location requested by the user, such as "fifty minutes after the beginning". The temporary storage unit 250 may be implemented in, for example, a typical hard disc.

In FIG. 2, the contents stored in the temporary storage unit 250 have been encrypted similarly to the contents stored in the disc drive 220. In other words, the contents are not stored in a decrypted state, and the key generation information is not stored together with the contents. Therefore, a multi-streaming apparatus with a copy protection can be implemented.

The decryption unit 230 decrypts the contents 224 and 252 by using the key generation information 222 and additional information (not shown) to produce decrypted contents 232 and 234, respectively. The decrypted content 232 corresponds to a content transmitted from the disc drive 220 (hereinafter, referred to as a first content), and the decrypted content 224 corresponds to a content transmitted to the temporary storage unit 250 (hereinafter, referred to as a second content). Therefore, the first content 232 is streamed to the first player, and the second content 234 is streamed to the second player.

Here, the additional information means information used or generated in the streaming apparatus 210, such as device identifications, renewal key blocks, and random numbers. The decryption unit 220 may include all functions to allow only legitimate users to decrypt corresponding contents through authentication of the streaming apparatus. Thus, the decryption unit 220 according to the present has a content protection capability.

The streaming server 240 generates streaming packets 242 and 244 by converting the decrypted contents 232 and 234, respectively, according to a predetermined streaming protocol. Then, they are transmitted to the first player 260 and the second player 265, respectively.

The players 260 and 265 have a structure similar to a conventional player, such as streaming player 260. In other words, the players 260 and 265 include streaming clients 270 and 275 for reorganizing the contents 272 and 277 by combining the streaming packets 242 and 244 and decoders 280 and 285 for producing video signals 282 and 287 by decoding the contents 272 and 277 according to a predetermined moving picture compression standard, respectively.

Figure 3:
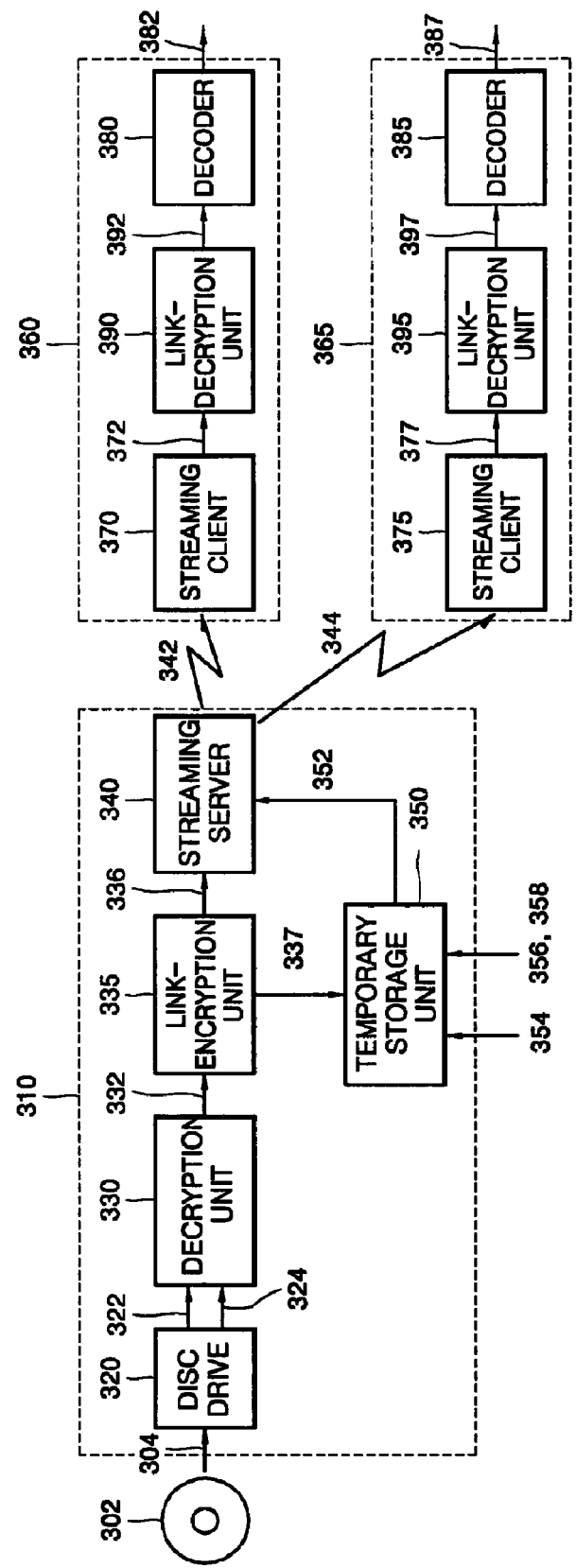
FIG. 3 is a block diagram illustrating a streaming apparatus consistent with another exemplary embodiment of the present invention.

FIG. 3 illustrates a streaming apparatus according to another exemplary embodiment of the present invention.

The streaming apparatus 310 includes a disc drive 320, a decryption unit 330, a link-encryption unit 335, a streaming server 340, and a temporary storage unit 350.

The disc drive 320 reads binary signals 304 from the storage medium 302, and extracts the contents 324 and the key generation information 322 from the binary signals. The key generation information 322 is information used to decrypt the contents 324, for example, information used to generate a decryption key for decrypting the contents.

The decryption unit 320 produces decrypted content 332 by decrypting the content 324 by using the key generation information 322 and additional information.

Here, the additional information means information used or generated in the streaming apparatus 310, such as device identifications, renewal key blocks, and random numbers. The decryption unit 320 may include all functions to allow only the legitimate users to decrypt corresponding contents through authentication of the streaming apparatus. Thus, the decryption unit 320 according to the present invention is provided with a content protection capability.

The link-encryption unit 335 receives the decrypted content 332 from the decryption unit 330 and encrypts it by using a link-encryption key to produce link-encrypted contents 336 and 337. Then, the link-encrypted contents 336 and 337 are transmitted to the temporary storage unit 350 and the streaming server 340. The link-encryption key (not shown) can be produced by using a symmetric or non-symmetric key as well as a link-decryption key of the player, and their description will not be given because such a method is already known in the art.

The temporary storage unit 350 receives and stores the link-encrypted contents 337 during streaming to the first player 360. Then, the link-encrypted contents 337 are transmitted to the streaming server 340 in response to a multi-streaming command 354 input by a user to the second player 365.

The streaming apparatus 310 shown in FIG. 3 is different from that shown in FIG. 2 as follows.

First, the temporary storage unit 350 does not store the contents 324 transmitted from the disc drive 320, but stores the link-encrypted contents 337 that have been decrypted by the decryption unit 330 and then link-encrypted by the link-encryption unit 335. Typically, the link-encryption/decryption is provided in a path between a streaming apparatus and players in a typical home network. Therefore, when the link-encrypted contents 337 are stored in the temporary storage unit 350, it is possible to more safely protect the contents stored in the temporary storage unit 350 by using a simple structure.

Secondly, the streaming server 340 performs a streaming not for the decrypted contents but for the link-encrypted contents 336 and 352. Therefore, it is possible to more safely transmit the contents to the players.

Similarly to FIG. 2, according to another embodiment of the present invention, the temporary storage unit 350 deletes all the contents stored in the temporary storage unit 350 when receives a streaming apparatus power-off command 356 or a storage medium eject command 358. According to another exemplary embodiment of the present invention, the streaming apparatus power off command 356 and the storage medium eject command 358 may be received from the disc drive 220.

Also, similarly to FIG. 2, according to still another exemplary embodiment of the present invention, the temporary storage unit 350 is designed to extract part of the contents corresponding to a playback location requested by a user and transmit them to the streaming server 340. In this case, the multi-streaming command input from a user includes information on the playback location requested by a user, such as "fifty minutes after the beginning".

In FIG. 3, the contents stored in the storage unit 350 have been link-encrypted unlike the contents stored in the disc drive. In other words, the contents stored in the storage unit 350 are similar to those of FIG. 2 in that the contents are not stored in a decrypted state and the key generation information is not stored together. Therefore, the streaming apparatus 310 of FIG. 3 can also implement a multi-streaming with a copy protection.

The streaming server 340 generates streaming packets 342 and 344 by converting the link-encrypted contents 336 and 352, respectively, according to a predetermined streaming protocol. Then, they are transmitted to the first player 360 and the second player 365, respectively.

The players 360 and 365 have a structure similar to a conventional player, but include the link-decryption units 390 and 395, respectively. In other words, the players 360 and 365 include streaming clients 370 and 375 for reorganizing the link-encrypted contents 372 and 377 by combining the streaming packets 342 and 344, link-decryption units 390 and 395 for producing the decrypted contents 392 and 397 by decrypting the link-encrypted contents 372 and 377, and decoders 380 and 385 for producing video signals 382 and 387 by decoding the decrypted contents 392 and 397 according to a predetermined moving picture compression standard, respectively.

The apparatuses according to the exemplary embodiments shown in FIGS. 2 and 3 may be designed in such a way that the data is encrypted and stored by using a temporary encryption key generated in the streaming apparatus 210, 310 when the data is stored in the temporary storage unit 250, 350, and that the data is transmitted to other components, such as the decryption unit 230 or the streaming server 340 in a decrypted state using a temporary decryption key when extracted from the temporary storage unit 250, 350. The temporary encryption/decryption key may be generated by using random numbers created every time when the data is stored. The generation of the temporary encryption/decryption key may be implemented by using a symmetric or non-symmetric key encryption structure, and their detailed descriptions will not be given because they are already known in the art.

Figure 4:
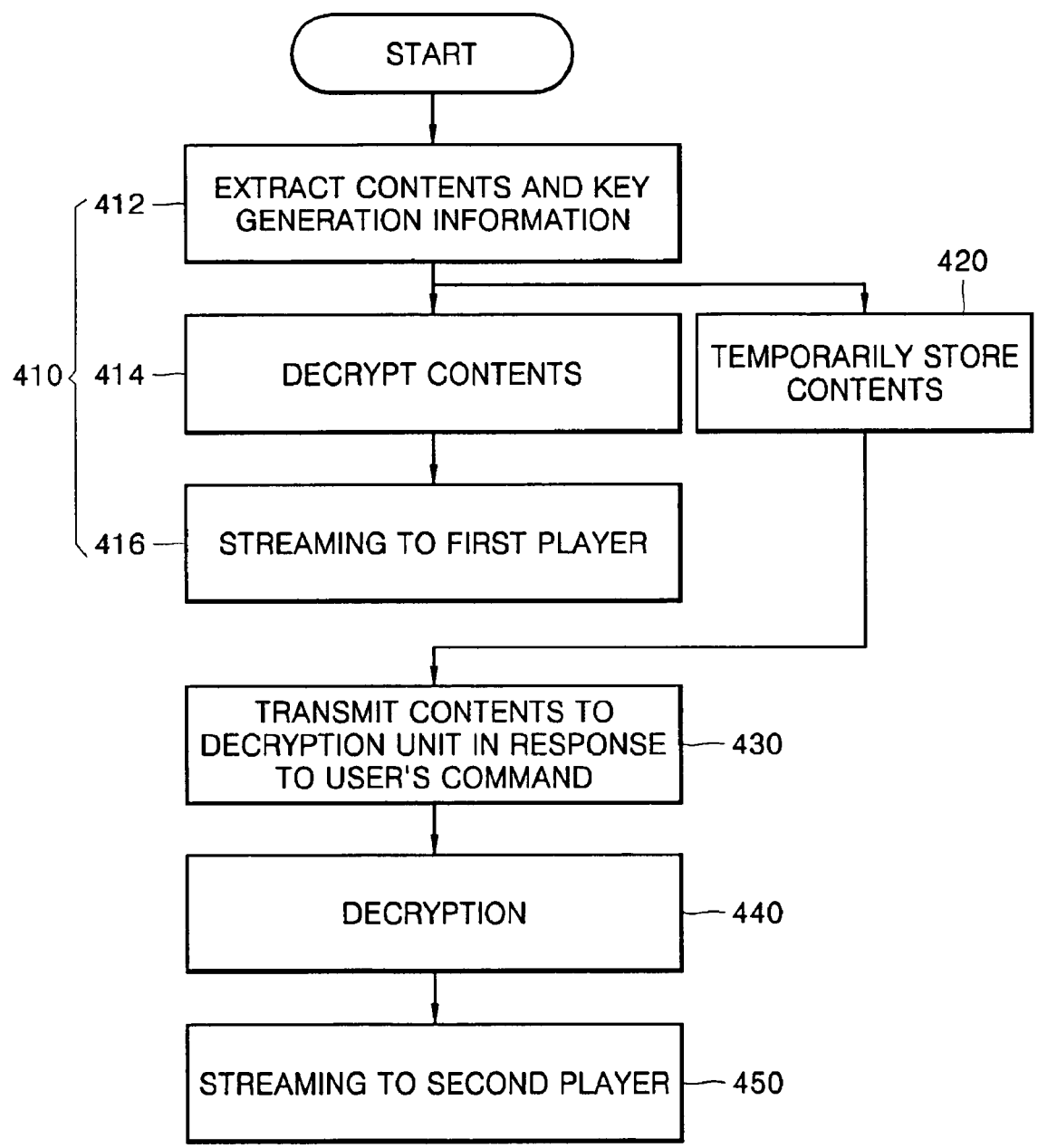
FIG. 4 is a flow chart illustrating a streaming method for the apparatus shown in FIG. 2.

FIG. 4 is a flow chart illustrating a streaming method according to the exemplary embodiment shown in FIG. 2.

In operation 410, the streaming apparatus 210 reads the content to be transmitted to the first player from the storage medium and performs a streaming. Operation 410 includes operation 412 through operation 416.

In operation 412, the disc drive 220 reads binary signals 204 from the storage medium 202, and extracts the content key 224 and the key generation information 222 from the binary signals 204.

In operation 414, the decryption unit 230 decrypts the content 224 by using the key generation information 222 to produce the decrypted content 232. Then, the decrypted content 232 is transmitted to the first player. Therefore, hereinafter, the decrypted content 232 is referred to as a first decrypted content.

In operation 416, the streaming server 240 performs a streaming of the first decrypted content 232 to the first player 260 according to a predetermined streaming protocol. In other words, the streaming server 240 generates the streaming packet 242 by using the first decrypted content 232 and then transmits it to the first player 260.

In operation 420, the temporary storage unit 250 receives and stores the content 224 from the disc drive 220 during the content 224 is streamed to the first player 260 in operation 410.

In operation 430, the temporary storage unit 250 transmits the content 252 stored in the temporary storage unit 250 to the decryption unit 230 in response to a multi-streaming command 254 to the second player 265 from a user. According to another embodiment of the present invention, the temporary storage unit 250 may be designed to extract part of the contents corresponding to a playback location requested by a user and transmit it to the decryption unit 220. In this case, the multi-streaming command input from a user includes information on the playback location requested by a user, such as "fifty minutes after the beginning".

In operation 440, the decryption unit 230 decrypts the content transmitted from the temporary storage unit 250 by using the key generation information 222 to produce the decrypted content 234. Then, the decrypted content 234 is transmitted to the second player. Therefore, hereinafter, the decrypted content 234 is referred to as a second decrypted content.

In operation 450, the streaming server 240 performs a streaming of the second decrypted content 234 to the second player 265 according to a predetermined streaming protocol.

Figure 5:
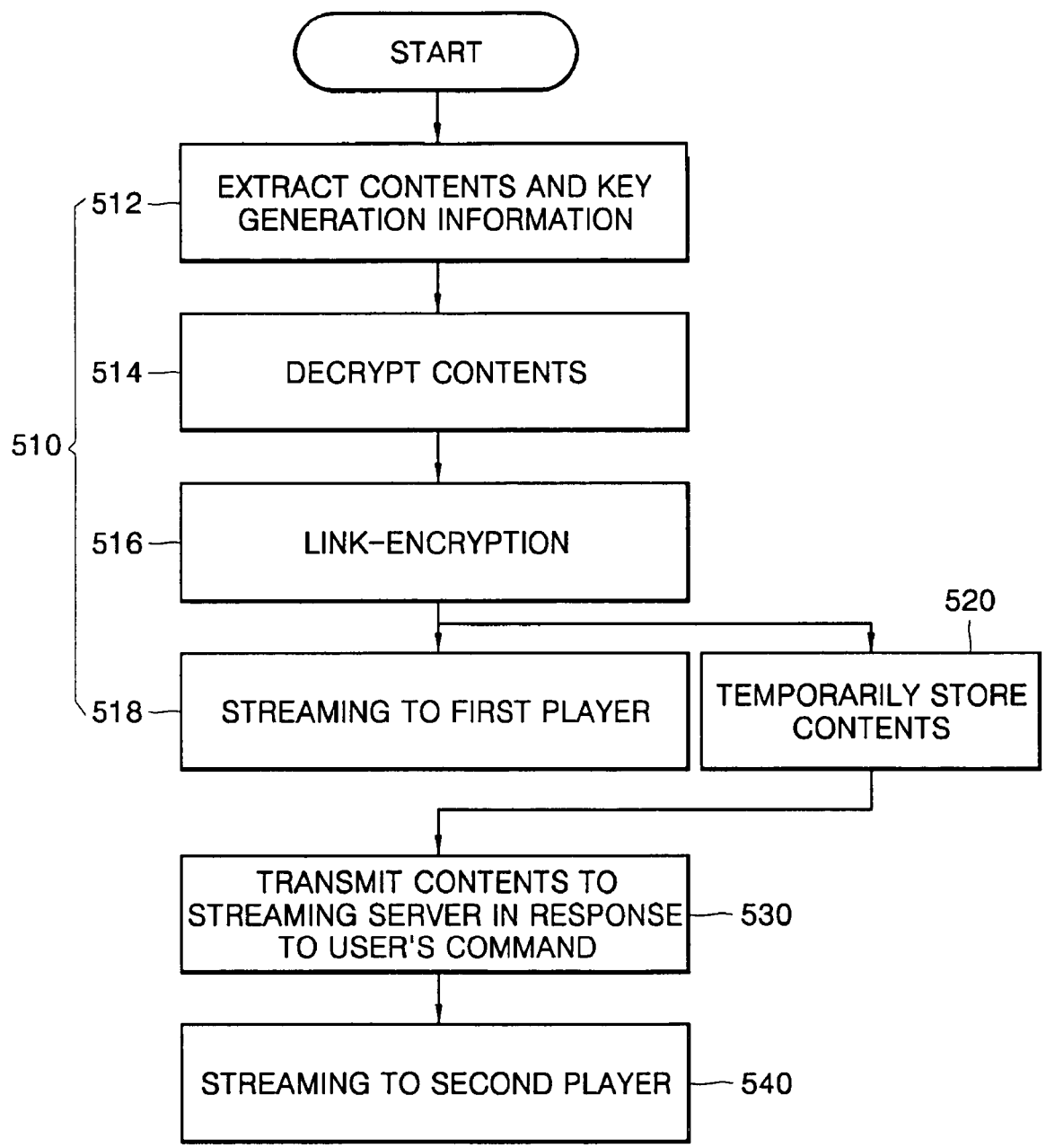
FIG. 5 is a flow chart illustrating a streaming method for the apparatus shown in FIG. 3.

FIG. 5 is a flow chart illustrating a streaming method according to the embodiment shown in FIG. 3.

In operation 510, the streaming apparatus 310 reads the content to be transmitted to the first player from the storage medium and performs a streaming. Operation 510 includes operation 512 through operation 518.

In operation 512, the disc drive 320 reads binary signals 304 from the storage medium 302, and extracts the content key 324 and the key generation information 322 from the binary signals 304.

In operation 514, the decryption unit 330 decrypts the content 224 by using the key generation information 322 to produce the decrypted content 332.

In operation 516, the link-encryption unit 335 receives the decrypted content 322 from the decryption unit 330, and encrypts it by using the link-encryption key to produce the link-encrypted contents 336 and 337. Then, the link-encrypted contents 336 and 337 are transmitted to the temporary storage unit 350 and the streaming server 340. The link-encryption key (not shown) can be generated by using a symmetric or non-symmetric key encryption algorithm as well as the link-decryption key of the player, and their detailed descriptions will not be given because such a method is already known in the art.

In operation 518, the streaming server 340 performs a streaming of the first link-encrypted content 336 transmitted from the link-encryption unit 335 to the first player 360 according to a predetermined streaming protocol.

In operation 520, the temporary storage unit 350 receives and stores the link-encrypted content 337 from the link-encryption unit 335 during the content 332 is streamed to the first player 360 in operation 510.

In operation 530, the temporary storage unit 350 transmits the content 352 stored in the temporary storage unit 350 to the streaming server 340 in response to a multi-streaming command 354 to the second player 365 from a user. According to another embodiment of the present invention, the temporary storage unit 350 may be designed to extract part of the contents corresponding to a playback location requested by a user and then transmit them to the decryption unit 220. In this case, the multi-streaming command input from a user includes information on the playback location requested by a user, such as "fifty minutes after the beginning".

In operation 540, the streaming server 240 performs a streaming of the link-encrypted content 234 transmitted from the temporary storage unit 350 to the second player 365 according to a predetermined streaming protocol.

The first and second players 360 and 365 combine the streaming packets 342 and 344 received from the streaming server 340 to reorganize the link-encrypted contents, and link-decrypts the link-encrypted contents according to a predetermined encryption algorithm. Then, the link-decrypted contents are decoded according to a predetermined moving picture compression standard to produce video signals. In other words, unlike the embodiment shown in FIG. 4, the link-decryption is added to the player side in the embodiment shown in FIG. 5. This is because the link-encrypted contents are stored in the temporary storage unit 350 and then streamed to the player.

The invention disclosed herein can also be embodied as computer-readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the presently disclosed invention, it is possible to provide a multi-streaming with a copy protection through temporary storage.

Also, according to the presently disclosed invention, it is possible to reduce noise caused by rotation of the disc in the streaming apparatus because the contents are temporarily stored in another storage medium and then streamed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for multi-streaming encrypted contents stored in a storage medium to a second player during streaming the contents to a first player, the apparatus comprising:
   a disc drive configured to read the encrypted contents stored on the storage medium,
   a decryption unit configured to decrypt the encrypted contents read by the disc drive,
   a streaming server configured to generate streaming packets by converting the decrypted contents according to a streaming protocol and to transmit the streaming packets to the first and second players, and
   a temporary storage unit,
      wherein the encrypted contents corresponding to the streaming packets to be transmitted to the second player are temporarily stored in a temporary storage medium prior to being transmitted to the second player in response to a multi-streaming command input by a user of the second player, and
      wherein key generation information required to decrypt the encrypted contents is not stored in the temporary storage medium.

2. The apparatus according to claim 1, further comprising a link encryption unit configured to link encrypt the encrypted contents stored on the storage medium by using the key generation information and to send the link encrypted contents to the temporary storage medium.

3. An apparatus for multi-streaming information to a second player during the streaming of the contents to a first player, the apparatus comprising:
   a disc drive configured to extract encrypted contents from a storage medium and to extract key generation information used to decrypt the encrypted contents from the storage medium;
   a temporary storage unit configured to receive and to store the encrypted contents extracted from the storage medium by the disc drive during the streaming of information to the first player, and to transmit the stored contents to a decryption unit in response to a multi-streaming command from the second player;
   the decryption unit configured to decrypt the contents by using the key generation information to produce decrypted contents; and
   a streaming server configured to perform a streaming of the decrypted contents to the first player and the second player according to a streaming protocol.

4. The apparatus according to claim 3, wherein
   the temporary storage unit is further configured to extract the contents corresponding to a playback location requested by a user and to transmit the contents corresponding to a playback location requested by a user to the decryption unit, and
   the multi-streaming command includes information on the playback location requested by the user.

5. The apparatus according to claim 3, wherein the temporary storage unit is configured to delete the contents stored in the temporary storage unit in response to a streaming apparatus power-off command from a user.

6. The apparatus according to claim 3, wherein the temporary storage unit is configured to delete the contents stored in the temporary storage unit in response to a storage medium eject command from a user.

7. The apparatus according to claim 3, wherein the temporary storage unit is a hard disc.

8. An apparatus for multi-streaming encrypted contents stored in a storage medium to a second player during streaming the contents to a first player, the apparatus comprising:
   a disc drive configured to extract encrypted contents stored and key generation information required to decrypt the contents from the storage medium;
   a decryption unit configured to decrypt the encrypted contents by using the key generation information to produce decrypted contents;
   a link-encryption unit configured to link-encrypt the decrypted contents by using a link-encryption algorithm;
   a streaming server configured to perform a streaming of the decrypted contents to the first player and the second player according to a streaming protocol; and
   a temporary storage unit configured to receive and store the contents from the disc drive during the streaming of the link-encrypted contents to the first player, and configured to transmit the stored contents to the streaming server in response to a multi-streaming command input by a user to the second player.

9. The apparatus according to claim 8, wherein
   the temporary storage unit is configured to extract part of the contents corresponding to a playback location requested by the user and to transmit the parts of the contents corresponding to a playback location requested by the user to the decryption unit, and
   the multi-streaming command includes information on the playback location requested by the user.

10. The apparatus according to claim 8, wherein the temporary storage unit deletes the contents stored in the temporary storage unit in response to a streaming apparatus power-off command.

11. The apparatus according to claim 8, wherein the temporary storage unit deletes the contents stored in the temporary storage unit in response to a storage medium eject command.

12. The apparatus according to claim 8, wherein the temporary storage unit is a hard disc.

13. A method of multi-streaming encrypted contents stored in a storage medium to a second player during streaming the contents to a first player, the method comprising:

temporarily storing the encrypted contents to be streamed to the first player in a temporary storage medium, wherein the temporarily storing the encrypted contents to be streamed to the first player in a temporary storage medium comprises:
  decrypting the contents by using the key generation information;
  link-encrypting the decrypted contents; and
  storing the link-encrypted contents in the temporary storage medium; and
streaming the stored contents to the second player in response to a multi-streaming command input by a user to the second player, wherein key generation information required to decrypt the encrypted contents is not stored in the temporary storage medium.

14. A method of multi-streaming encrypted contents stored in a storage medium to a second player during streaming the contents to a first player, the method comprising:
  streaming the contents to the first player, wherein the streaming to the first player comprises:
    extracting the contents and key generation information required to decrypt the contents from the storage medium;
    decrypting the contents by using the key generation information; and
    streaming the decrypted contents to the first player according to a predetermined streaming protocol;
  storing the contents in a temporary storage medium in an encrypted state during streaming the contents to the first player;
  decrypting the stored contents in response to the multi-streaming command to the second player; and
  streaming the decrypted contents to the second player.

15. The method according to claim 14, wherein part of the contents corresponding to a playback location requested by a user are decrypted during the decrypting, and the multi-streaming command includes information on the playback location requested by the user.

16. The method according to claim 14, further comprising deleting the contents stored in the temporary storage medium in response to a streaming apparatus power-off command or a storage medium eject command from a user.

17. The method according to claim 14, wherein the temporary storage medium is a hard disc.

18. A method of multi-streaming encrypted contents stored in a storage medium to a second player during streaming the contents to a first player, the method comprising:
  streaming the contents to the first player in a link-encrypted state, wherein the streaming to the first player comprises:
    extracting the contents and key generation information required to decrypt the contents from the storage medium;
    decrypting the contents by using the key generation information;
    link-encrypting the decrypted contents by using a predetermined link-encrypted algorithm; and
    streaming the link-encrypted contents to the first player according to a predetermined streaming protocol;
  storing the contents in a temporary storage medium in a link-encrypted state during streaming the contents to the first player; and
  streaming the stored contents to the second player in response to a multi-streaming command to the second player.

19. The method according to claim 18, wherein part of the contents corresponding to a playback location requested by a user are streamed during the streaming to the second player, and the multi-streaming command includes information of the playback location requested by the user.

20. The method according to claim 18, further comprising deleting the contents stored in the temporary storage medium in response to a streaming apparatus power-off command or a storage medium eject command.

21. The method according claim 18, wherein the storage medium is a hard disc.

22. A non-transitory computer readable recording medium storing a program for implementing the method according to claim 14 in a computer.

* * * * *